(12) United States Patent
Klippstein et al.

(10) Patent No.: US 9,881,531 B2
(45) Date of Patent: Jan. 30, 2018

(54) SWITCHABLE LIGHTING DEVICE AND USE THEREOF

(71) Applicant: SIOPTICA GMBH, Jena (DE)

(72) Inventors: Markus Klippstein, Jena (DE); Juergen Schwarz, Apolda (DE)

(73) Assignee: SIOPTICA GMBH, Jena (DE)

( * ) Notice: Subject to any disclaimer, the term of this patent is extended or adjusted under 35 U.S.C. 154(b) by 44 days.

(21) Appl. No.: 15/119,358

(22) PCT Filed: Feb. 13, 2015

(86) PCT No.: PCT/EP2015/053050
§ 371 (c)(1),
(2) Date: Aug. 16, 2016

(87) PCT Pub. No.: WO2015/121398
PCT Pub. Date: Aug. 20, 2015

(65) Prior Publication Data
US 2017/0069236 A1    Mar. 9, 2017

(30) Foreign Application Priority Data

Feb. 17, 2014 (DE) .................. 10 2014 002 338

(51) Int. Cl.
*G09G 3/00* (2006.01)
*G02F 1/1335* (2006.01)
(Continued)

(52) U.S. Cl.
CPC ........... *G09G 3/003* (2013.01); *G02B 6/0031* (2013.01); *G02B 6/0041* (2013.01);
(Continued)

(58) Field of Classification Search
CPC ... G02F 2001/133607; G02F 1/133604; G02F 1/133603; G02F 1/1323
See application file for complete search history.

(56) References Cited

U.S. PATENT DOCUMENTS 5,993,940 A    11/1999    Ouderkirk et al.
6,211,930 B1    4/2001    Sautter et al.
(Continued)

FOREIGN PATENT DOCUMENTS

DE    10 2006 056 150 A1    5/2008
GB    2 428 128 A    1/2007
(Continued)

*Primary Examiner* — Gerald Johnson
(74) *Attorney, Agent, or Firm* — Christensen, Fonder, Dardi & Herbert PLLC

(57) ABSTRACT

A lighting device for operation in at least two operating modes: a mode for free viewing and a mode for restricted viewing. The device includes a backlighting system, which in the restricted-viewing mode radiates light in a restricted angular range, a plate-shaped optical element situated along a viewing direction in front of the backlighting system, and illuminants laterally arranged at the optical element. The optical element is configured as a light guide consisting of a matrix plastic and, homogeneously distributed therein, scattering particles of a polymer. The light guide is transparent to at least 80% of the light emitted by the backlighting system. The light laterally incident on the optical element from the illuminants is radiated in a free viewing range; in the restricted-viewing mode, the backlighting system is switched on and the illuminants switched off; in the free-viewing mode, the illuminants are on and the backlighting system is off.

18 Claims, 2 Drawing Sheets

(51) Int. Cl.
*G02F 1/13* (2006.01)
*G09G 3/34* (2006.01)
*F21V 8/00* (2006.01)

(52) U.S. Cl.
CPC .......... *G02F 1/1323* (2013.01); *G02F 1/1336* (2013.01); *G09G 3/342* (2013.01); *G09G 3/3426* (2013.01); *G02B 6/0076* (2013.01); *G02F 1/133603* (2013.01); *G02F 2001/133626* (2013.01); *G02F 2203/62* (2013.01); *G09G 2320/068* (2013.01); *G09G 2358/00* (2013.01)

(56) References Cited

U.S. PATENT DOCUMENTS

| | | | |
|---|---|---|---|
| 6,765,550 | B2 | 7/2004 | Janick et al. |
| 7,675,598 | B2 | 3/2010 | Hong |
| 7,974,506 | B2 | 7/2011 | Wittenberg et al. |
| 2006/0077688 | A1* | 4/2006 | Uehara ................ G02B 6/0046 362/613 |
| 2006/0152931 | A1* | 7/2006 | Holman .................... F21S 8/08 362/297 |
| 2007/0046860 | A1 | 3/2007 | Daiku |
| 2007/0076434 | A1 | 4/2007 | Uehara et al. |
| 2008/0007677 | A1* | 1/2008 | Enomoto .......... G02F 1/133504 349/106 |
| 2008/0112187 | A1 | 5/2008 | Katsumata et al. |
| 2009/0067156 | A1 | 3/2009 | Bonnett et al. |
| 2009/0096956 | A1* | 4/2009 | Uehara ................ G02B 6/0046 349/64 |
| 2011/0025956 | A1* | 2/2011 | Usukura ........... G02F 1/133504 349/95 |
| 2011/0261584 | A1* | 10/2011 | Boyd .................... G02B 6/0053 362/607 |
| 2011/0280044 | A1* | 11/2011 | Niioka ..................... G02B 3/08 362/607 |
| 2012/0235891 | A1 | 9/2012 | Nishitani et al. |
| 2014/0049944 | A1* | 2/2014 | Niioka ..................... G02B 3/08 362/97.1 |
| 2015/0168632 | A1* | 6/2015 | Yasuhara ............ G02B 6/0053 349/65 |
| 2015/0293402 | A1 | 10/2015 | Skinkai et al. |

FOREIGN PATENT DOCUMENTS

| | | |
|---|---|---|
| JP | 2005-134678 A | 5/2005 |
| JP | 2006-117920 A | 5/2006 |
| JP | 2007-066555 A | 3/2007 |
| JP | 2007-103062 A | 4/2007 |
| JP | 2007-155783 A | 6/2007 |
| JP | 2008-123925 A | 5/2008 |
| JP | 2010-078795 A | 4/2010 |
| JP | 2010-532910 A | 10/2010 |
| TW | 201407196 A | 2/2014 |
| TW | M492499 U | 12/2014 |
| WO | WO 2007/108312 A1 | 9/2007 |
| WO | WO 2009/002512 A1 | 12/2008 |
| WO | WO 2009/050505 A1 | 4/2009 |
| WO | WO 2012/033583 A1 | 3/2012 |
| WO | WO 2013/049088 A1 | 4/2013 |

* cited by examiner

SWITCHABLE LIGHTING DEVICE AND USE THEREOF

PRIORITY CLAIM

The present application is a National Phase entry of PCT Application No. PCT/EP2015/053050, filed Feb. 13, 2015, which claims priority from German Patent Application Number 102014002338.9, filed Feb. 17, 2014, the disclosures of which are hereby incorporated by reference herein in their entirety.

FIELD OF THE INVENTION

Efforts to widen the viewing angle of LCDs have made great progress in recent years. Frequently, though, there are situations in which the very large viewing range of a display screen can be a disadvantage. Increasingly, mobile devices such as notebooks and tablet PCs provide information such as banking, personal and other sensible data. Therefore, users need to have control of who is allowed to see these sensible data; they must be able to select between a wide viewing angle to share displayed information with others, e.g. when looking at vacation snaps or for advertising purposes, and a small viewing angle, where the information displayed is to be kept private.

BACKGROUND OF THE INVENTION

Accessory films featuring closely spaced louvers have already been used for mobile displays to provide privacy of the optical data displayed. Rather than being switchable, though, these films have to be applied and removed manually, and they have to be carried separately from the display when not in use. Another essential disadvantage of such louver films is the light loss they entail.

Such a privacy filter using closely spaced louvers is described in U.S. Pat. No. 6,765,550. Here, the troublesome disadvantages are the need to remove or attach the filter mechanically, and the light loss in the protected mode.

U.S. Pat. No. 5,993,940 describes the use of a film the surface of which is provided with a regular arrangement of narrow prismatic stripes to achieve a privacy mode. The development and fabrication of this film are rather complicated.

In WO 2012/033583, switching between free and restricted view is brought about by triggering liquid crystals between layers known as "chromonic". This entails a light loss, and the technology is quite complex.

US 2009/0067156 discloses quite a number of ideas of how to configure a lighting system and a display unit. The version illustrated by FIGS. 3A and 3B therein uses, in particular, two backlights consisting of wedge-shaped light guides, and an LCD panel, with the rear backlight 40 being claimed to compellingly generate a wide illuminating angle and the backlight 38 in front of it being claimed to compellingly generate a narrow illuminating angle. It is not clear, though, by what mode of operation the backlight 38 is meant to generate a narrow illuminating angle without converting the light coming from backlight 40 with a wide illuminating angle into light with an essentially narrow illuminating angle when it passes backlight 38.

Concerning the configuration according to FIG. 5 of US 2009/0067156, it is to be remarked that light guides 46 and 48 both produce "narrow light", i.e. light with a narrow illuminating angle. Conversion of the light of light guide 48 into "wide light", i.e. light with a wide illuminating angle, is brought about only by means of a beam-splitting mirror 50 with a prism structure that is complicated to fabricate. This conversion extremely curtails the light intensity, since the light first radiated in a narrow angle, which is the only light available, is then fanned out over a large angle, which is the half-space, as a rule. As a result, brightness (in terms of luminance) is diminished by a factor of 5 or more, depending on the parameters. Thus, this is a configuration of little relevance in practice.

In the configuration according to FIG. 7 of US 2009/0067156, a layer of phosphor is essential to convert UV light into visible light. This is quite a complex design, and given the need to get sufficient light from the backlight to illuminate an LCD panel so as to permit reading it, UV light of very high intensity is required. This is expensive and complicated; shielding the necessary UV radiation alone makes this configuration impracticable.

US 2012/0235891 describes a highly complex backlight in a display screen. According to FIGS. 1 and 15 there, not only several light guides are employed, but also further complex optical elements such as microlens elements 40 and prism structures 50, which convert the light emitted by the rear backlighting system on its way to the second backlighting system. To implement this is expensive and complicated, and it entails light loss as well. In the version according to FIG. 17 in US 2012/0235891, light sources 4R and 18 both produce light with a narrow illuminating angle, with the light emitted by the rear light source 18 first being converted into light with a large illuminating angle in a complex manner. As mentioned above, this complex conversion diminishes brightness significantly.

In JP 2007-155783, special optical surfaces 19 that are complicated to design and fabricate are used to deflect light into various narrow or wide ranges depending on the angle of light incidence. These structures resemble Fresnel lenses and feature inactive edges that deflect light into unwanted directions. Thus, it remains unclear whether really useful light distributions can be achieved.

As a rule, the methods and arrangements mentioned above have the following disadvantages in common: They distinctly reduce the brightness of the basic display screen, and/or require an active optical element for switching between modes, and/or are complicated and expensive to fabricate, and/or reduce resolution in the free viewing mode.

SUMMARY OF THE INVENTION

Therefore, the problem of the invention is to specify a switchable lighting device intended to provide at least two lighting modes, with one mode illuminating a limited solid angle only, and the other mode permitting illumination of the largest possible solid angle. Thus, if the lighting device is used with a display screen, it should, by means of the option of a restricted viewing angle, ensure the privacy of information presented, whereas a second mode should permit free viewing in a viewing angle that is preferably unrestricted. Implementation of the lighting device should be possible by simple means and at reasonable cost. In either mode, the user should be offered the highest possible resolution or, with particular preference, the native resolution of the display screen used. Further, the solution should entail the least possible light loss.

According to the invention, that problem is solved by a lighting device usable in at least two operating modes, viz. a free viewing mode B1 and a restricted viewing mode B2, comprising a backlighting system of planar extension that in mode B2 for restricted viewing radiates light in a restricted angular range, wherein the light emerging from the backlighting system is, in at least one direction oriented at an angle greater than 45 degrees relative to the surface normal of the backlighting system, radiated with no more than 10% of the maximum luminous intensity, a plate-shaped optical element located in front of the backlighting system (seen in the viewing direction), and illuminants arranged laterally at the narrow sides of the optical element, wherein the optical element is configured as a light guide, which consists of a matrix plastic A and, homogeneously distributed therein, scattering particles of a polymer B, the share of the scattering particles consisting of polymer B is 0.01 to 3 weight-percent relative to the matrix plastic A, the refractive index nD(B) of the polymer B is at least 0.01 units above the refractive index nD(A) of the matrix plastic A, and the light guide is transparent to at least 80% of the light emergent from the backlighting system, so that, for a free viewing range in mode B1, the light laterally incident on the optical element from the illuminants is, in directions oriented at angles larger than 45 degrees relative to the surface normal of the backlighting system, radiated with at least 20% of the maximum luminous intensity, and wherein in mode B2, the backlighting system is switched on and the illuminants are switched off, whereas in mode B1, the illuminants are switched on and the backlighting system is switched off.

The said matrix plastic A is preferably incompatible with the polymer B.

The plate-shaped optical element consists of two mutually opposite large surfaces arranged in parallel with each other. In particular, any wedge-shaped structure is to be ruled out. The two large surfaces are bordered by four narrow sides, which can be used for coupling the light emitted by the illuminants into the optical element. The scattering particles are distributed homogeneously, so that the optical element does not have any inhomogeneous optical structure.

Thanks to this configuration of the optical element with polymer scattering particles homogeneously distributed in a matrix plastic, light emitted by the backlighting system and originally radiated in a restricted angular range will not, or at least only in a negligible degree, be converted into light radiated in a non-restricted angular range—neither in the optical element nor in the entire lighting device.

In mode B2, the light emitted by the backlighting system is, in at least one direction oriented at an angle greater than 45 degrees relative to the surface normal, radiated with no more than 10% of the maximum luminous intensity. Projected onto the surface, this direction may be a horizontal one relative to a viewer; it is sensible then to restrict radiation in the horizontal plane. Normal to this, i.e. in the vertical, radiation need not necessarily be restricted; the converse configuration is feasible as well, though. Transition between the restricted and the non-restricted radiation range may be continuous or discrete. In a preferred embodiment that is easy to manufacture, radiation in mode B2 takes place in a restricted angular range, but in all directions oriented at angles greater than 45 degrees relative to the surface normal of the backlighting system, i.e. outside the 45-degree cone, it takes place with no more than 10% of the maximum luminous intensity, in order to restrict the visibility of private information as completely as possible.

In other words, the lighting device that can be used in at least two operating modes B1, B2, . . . , comprises a backlighting system of planar extension, which in mode B2 for a restricted viewing range radiates light with such radiation characteristics that in directions oriented at angles greater than 45 degrees relative to the surface normal of the backlighting system, at most 10% of the maximum luminous intensity are radiated, an optical element located in front of the backlighting system along the viewing direction, this element to be transparent to at least 80% of the light emitted by the backlighting system, and to deflect, in the widest possible angular range, light incident laterally from illuminants at angles of more than 80 degrees relative to the element's surface normal, so that, in directions oriented at angles greater than 45 degrees relative to the surface normal of the backlighting system, at least 20% of the maximum luminous intensity are radiated, wherein the optical element is configured as a light guide as described above, and wherein in mode B2 the backlighting system is on, whereas the illuminants are off, and wherein in mode B1 the illuminants are on, whereas the backlighting system is off.

In principle, the efficiency of this configuration of the invention is maintained if the parameters described above are varied within certain limits. For example, the backlighting system may radiate light with such radiation characteristics that in directions oriented at angles greater than 10 . . . 45 degrees relative to the surface normal of the backlighting system, at most 0 . . . 20% of the maximum luminous intensity are radiated.

Irrespective of that, the optical element that is located in front of the backlighting system along the viewing direction may be transparent to 80% —or else to less than 80%, say 70% or only 50% even—of the light emergent from the backlighting system, and it may deflect, in an angular range that is as wide as possible, the light laterally incident from illuminants at angles greater than 80 degrees relative to the element's surface normal, so that, in directions oriented at angles greater than 10 . . . 70 degrees relative to the surface normal of the backlighting system, at least 10 . . . 70% of the maximum luminous intensity are radiated.

Furthermore, it is to be noted that, whereas the light incident on the optical element laterally from the illuminants for a free viewing range, i.e. in mode B1, is, in directions oriented at angles greater than 45 degrees relative to the surface normal of the backlighting system, radiated with at least 20% of the maximum luminous intensity, it is a matter of course that a major portion of the light is also radiated or coupled out in directions oriented at angles smaller than 45 degrees relative to the surface normal of the backlighting system, so that altogether a very wide angular range, at best approximately the half-space in front of the optical element, is illuminated.

The scattering particles in the optical element, i.e. in the light guide, constitute the appropriate light output structure.

The backlighting system may favorably be configured as a side light, edge light, direct LED backlight, edge LED backlight, OLED or some other surface emitter. The backlighting system may also be a darkfield light source.

For example, the backlighting system may be a typical backlight (edge light, direct LED backlight or the like), with a permanent privacy filter (e.g. Vikuiti™ of 3M™) applied upon it in order to curtail the radiation characteristics of the light to such an extent that the light is radiated essentially in a restricted solid angle only.

With particular preference, however, the backlighting system contains, in place of a permanent privacy filter, at least one optical layer for light collimation in order to achieve reduced-angle radiation characteristics of the light it radiates. For example, there may be two crossed layers of the kind of Optical Lighting Film (OLF) Type 2301 of 3M™.

The scope of the invention also includes the use of the lighting device as described before, but with a transmissive imager, e.g. an LCD panel, arranged in front of it, so that in mode B1, i.e. the free viewing mode, the image presented on the imager is visible from essentially every direction inclined maximally by 90 degrees relative to the vertical bisector of the imager, and so that in mode B2, i.e. the restricted viewing mode, the image presented on the imager is visible essentially from those directions only that are inclined maximally by 45 degrees relative to the vertical bisector of the imager.

As described above, the angular dimensions may vary with the configuration of the components. In certain applications, a certain residual light in case of oblique viewing from large angles, e.g. above 45 degrees relative to the vertical bisector of the imager, is permissible. The illuminants may be LEDs or laser diodes, for example. Other configurations are possible.

Eventually, there may be further operating modes, e.g. a mode B3, in which both components, i.e. the backlighting system and the illuminants, are switched on at a time. If the lighting device is used in mode B3 with an imager, a particularly bright image results that becomes darker toward the margin. Other operating modes, e.g. such with dimmed lighting levels for the backlighting system as well as for the illuminants, are feasible. Moreover, the transition between operating modes, especially from B1 to B2 or vice versa, can be controlled to be gradual, e.g. if the brightness of the backlighting system is dimmed down to zero over a certain time span, say, of one to two seconds, whereas the brightness of the illuminants is simultaneously turned up to a maximum or to a specified level, and vice versa. If the invented device is used with an imager, then, a pleasing transition takes place between the free viewing mode and the restricted viewing mode. In a preferred embodiment, therefore, the lighting device comprises an electronic control system, which gradually controls the transition between modes B1 and B2 or vice versa.

Furthermore, the invention can be advantageously developed as follows:

The light guide constituting the optical element may consist, e.g. of the material known as Evonik LD12 8N or Evonik PLEXIGLAS® LED film 15950/99/1-3.

Also, it is useful for light coupling from the laterally arranged illuminants to take place from at least two, preferably mutually opposite sides.

By means of a partially reflecting coat on the side of the optical element facing the backlighting system, an overall improvement of light output can be achieved, because light exiting towards the backlighting system is then reflected back into useful light directions.

In a preferred embodiment, the optical element is provided with a partially reflecting coat on its end facing the backlighting system, with the degree of reflection varying across the area, so that, in the free viewing mode B1, across-the-area brightness differences of the light coupled out of the optical element can be compensated. These brightness differences occur because of inhomogeneous lighting, which results from the illuminants being arranged on the sides only. A content imaged is darker in the middle than on the margins, which are closer to one of the illuminants. The variation can be accomplished in various ways. First, the degree of reflection, i.e. the ratio of reflection and transmission, can be made continuously variable, so that reflection is highest where the brightness of the radiated light is lowest. Alternatively, a limit brightness relative to the maximum brightness can be specified, and the optical element is provided with a partially reflecting, i.e. only unidirectionally transparent layer only in those areas in which brightness—without the reflecting layer—has fallen short of the specified limit. This version is more cost-effective.

Besides, a partially reflecting coat on the rear side of the transmissive imager is highly advantageous for the further homogenization of the light output from the optical element. This coat, too, analogously to the partially reflecting coat on the optical element, may be designed to vary across the area or be applied only in selected regions thereof, to compensate for brightness differences.

Further improvements in light output can be achieved if the optical element, for better coupling out, is structured by means of a laser so as to have a multitude of pits, with the pits not being greater than 250 µm in diameter so that (a) they are invisible, and (b) they do not scatter the angularly restricted light coming from the backlighting system. The pits may be arranged on the optical element with their distribution varying over the surface in a gradient-like or other fashion.

Alternatively or in addition, the optical element may be a plate-shaped light guide with integrated prisms, with light-outcoupling microprisms being integrated in one surface of the light guide, and with the microprisms configured as cones.

Further, it is of advantage to have a backlighting system in which the backlight is already designed to be collimated, i.e. with the light source being conceived to radiate light only in an angular range that is restricted as described herein before. It may further be favorable to use always the same light sources, e.g. the laterally arranged illuminants, for both modes. For switching between modes B1 and B2, then, the light will be coupled either into the optical element or into the backlighting system, e.g. by means of an optoelectronic or optomechanical switch. That switch may be, e.g., a shutter or some mechanism such as a tilting mirror. Further, the illuminants may be of a two-line configuration, with only the required line being switched on at a time. This last-mentioned version is of particular advantage in case the lighting device also provides for the above-described third operating mode B3.

Moreover, the desired or permitted radiation directions for mode B2, i.e. the restricted viewing mode, may be separately defined and implemented for the horizontal and the vertical direction, respectively. For example, it may be useful to have a larger angle in the vertical than in the horizontal direction, e.g., in case of the displays of automated teller machines, which have to be read by persons of differing heights, while oblique viewing is to be greatly restricted.

In another favorable embodiment, the lighting device is provided with a control system, which in mode B1, i.e. the free viewing mode, compensates for across-the-area brightness differences of the light coupled out of the optical element by means of controlling the image contents presented on the transmissive imager in a way that is complementary to these brightness differences, so that the image seen on the transmissive imager is essentially homogeneous as regards brightness. In other words: Should there arise brightness differences from coupling out of the optical element—e.g. gradients in one (e.g. horizontal) or more directions (e.g. horizontal and vertical direction related to the viewer, or in oblique directions), or brightness spots —, the image presented will be dimmed accordingly. For this purpose, after measuring the brightness differences, the system may determine reciprocal values of the relative brightness, e.g., normalized with a fixed factor, i.e. of the brightness normalized to values at which the highest relative brightness equals and multiply these reciprocal values by the brightness values of the respective image details. In this way, the darkest details will not be dimmed, whereas the brightest details will be dimmed most.

It is understood that the features mentioned before and those to be explained below are applicable not only in the combinations stated but also in other combinations or as stand-alone features without leaving the scope of the present invention.

Below, the invention will be explained in more detail with reference to the accompanying drawings, which show features essential to the invention, among others, and in which

The drawings are not to scale and represent the principles only.

DETAILED DESCRIPTION

Figure 1:
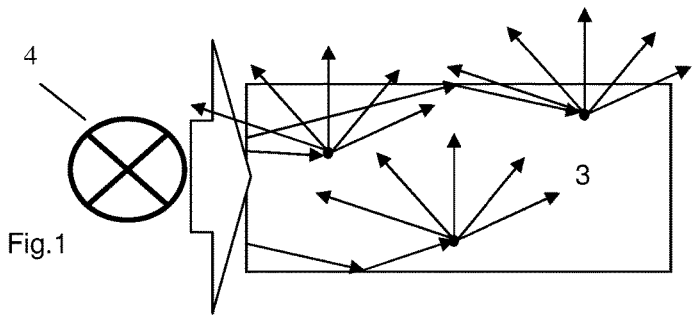
FIG. 1 is a sketch of the principle of how light coupled laterally into an optical element is coupled out into a solid angle that is as wide as possible.

FIG. 1 is a sectional view of a small detail, illustrating the principle of the output coupling of light that is laterally coupled from illuminants 4 into an optical element 3, with the outcoupling taking place into a solid angle of the greatest possible width. The small dots represent scattering particles intended as scattering centers for the light coupled in laterally from the illuminants 4. Due to total reflection, rays of this coupled-in light are repeatedly reflected from the outer wall back into the light guide until they hit a scattering particle, which effects the desired output coupling. For easier understanding, the representation in FIG. 1 is highly simplified; in reality, there is a vast multitude of ray paths in the optical element 3.

Figure 2:
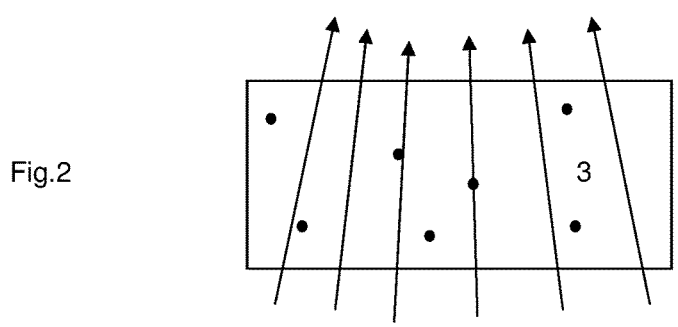
FIG. 2 is a sketch of the principle of how light emerging from a backlighting system passes the optical element.

FIG. 2 is a sketch of the principle of the passage of light emerged from a backlighting system 2 through the optical element 3. Here, the scattering particles play a negligible role, because the light emerges from the backlighting system 2 in a directed manner and is not, or scarcely, directed back and forth by total reflection in the light guide.

Figure 3:
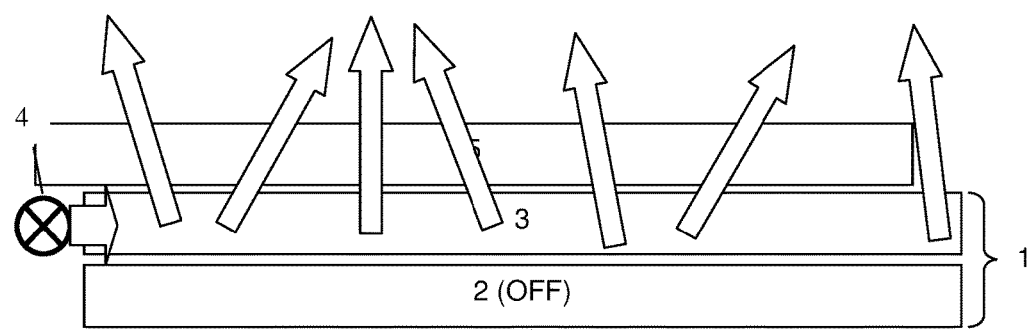
FIG. 3 is a sketch of the principle of a lighting device in a first operating mode B1 for free viewing, wherein the largest possible solid angle is illuminated, with the lighting device being used together with an imager.
Figure 4:
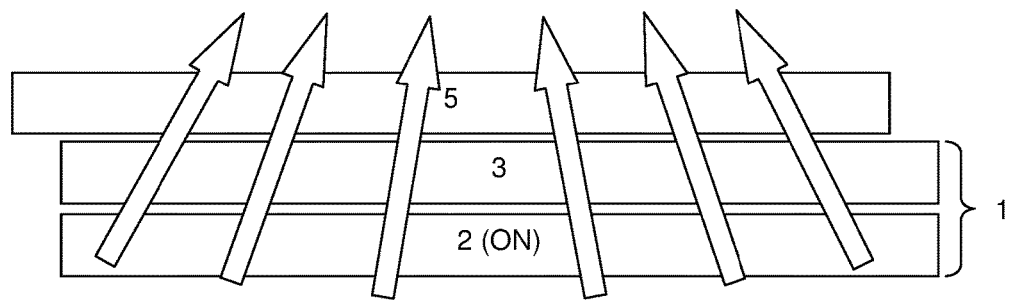
FIG. 4 is a sketch of the principle of a lighting device in a second operating mode B2 for restricted viewing, wherein a restricted solid angle is illuminated, with the lighting device being used together with an imager.

FIG. 3 is a sketch of the principle of a lighting device 1 in a first operating mode B1, a free viewing mode, in which a solid angle is illuminated that is as wide as possible, with the lighting device 1 being used together with an imager 5 here. FIG. 4 shows the lighting device 1 in a second operating mode B2, a restricted viewing mode, in which only a restricted solid angle is illuminated.

The lighting device 1, which can be used in at least two operating modes B1, B2, . . . , comprises a backlighting system 2 of planar extension that in mode B2 for restricted viewing radiates light in a restricted angular range, wherein the light emergent from the backlighting system is, in at least one direction oriented at an angle greater than 45 degrees relative to the surface normal of the backlighting system, radiated with no more than 10% of the maximum luminous intensity, a plate-shaped optical element 3 located in front of the backlighting system 2 as seen in the viewing direction, and illuminants 4 arranged laterally at the narrow sides of the optical element 3, wherein the optical element 3 is configured as a light guide, which consists of a matrix plastic A and, homogeneously distributed therein, scattering particles of a polymer B, the share of the scattering particles consisting of polymer B is 0.01 to 3 weight-percent relative to the matrix plastic A, the refractive index nD(B) of the polymer B is at least 0.01 units above the refractive index nD(A) of the matrix plastic A, and the light guide is transparent to least 80% of the light emitted by the backlighting system 2, so that, for a free viewing range in mode B1, the light laterally incident on the optical element 3 from the illuminants 4 is, in directions oriented at angles larger than 45 degrees relative to the surface normal of the backlighting system 2, radiated with at least 20% of the maximum luminous intensity, and wherein in the second mode B2, the backlighting system 2 is switched on and the illuminants 4 are switched off, whereas in the first mode B1, the illuminants 4 are switched on and the backlighting system 2 is switched off.

Thanks to this configuration of the optical element 3 with polymer scattering particles homogeneously distributed in a matrix plastic, light emitted by the backlighting system 2 and originally radiated in a restricted angular range will not, or at least only in a negligible degree, be converted into light radiated in a non-restricted angular range—neither in the optical element 3 nor in the entire lighting device 1.

It is to be noted here that, whereas the light laterally incident on the optical element 3 from the illuminants for a free viewing range, i.e. in mode B 1, is, in directions oriented at angles greater than 45 degrees relative to the surface normal of the backlighting system 2, radiated with at least 20% of the maximum luminous intensity, it is a matter of course that, in directions oriented at angles smaller than 45 degrees relative to the surface normal of the backlighting system 2, a major portion of the light is also radiated or coupled out, so that altogether a very wide angular range, at best approximately the half-space in front of the optical element 3, is illuminated.

The first operating mode B1 for a free viewing range, then, allows an image on the imager 5, e.g. an LCD panel, to be perceived fully resolved from a solid angle as wide as possible. Unlike that, in the second operating mode B2 for a restricted viewing range, the image on the imager 5 can be perceived fully resolved, too, but only from a restricted solid angle, which is appropriate for a private viewing mode, also known as privacy mode. Depending on the parameters for the illuminating angles, the visible area of the image presented by the imager 5 may also be perceived in a restricted solid angle then. In a third operating mode B3 not shown in the figures, both the backlighting system 2 and the illuminants 4 may be switched on to obtain an image as bright as possible.

The lighting device 1 may be varied in many ways to achieve the desired effects.

The backlighting system 2 may favorably be configured as a side light, edge light, direct LED backlight, edge LED backlight, OLED or some other surface emitter. It is also possible for the backlighting system 2 to be a darkfield light source. Particularly preferable, however, the backlighting system 2 is a typical backlight, i.e. one based on edge light, direct LED backlight or the like, with a permanent privacy filter (e.g. Vikuiti™ of 3M™) applied upon it in order that the light is radiated essentially in a restricted solid angle only.

In certain applications, a certain residual light in case of oblique viewing from large angles, e.g. above 45 degrees relative to the vertical bisector of the imager 5, is permissible. The illuminants 4 may be LEDs or laser diodes, for example. Other configurations are possible.

Favorably, in the first operating mode B1 (the free viewing mode), across-the-area brightness differences of the light coupled out of the optical element 3 are compensated by controlling the image contents presented on the transmissive imager 5 in a way that is complementary to these brightness differences, so that the image seen on the transmissive imager 5 is essentially homogeneous as regards brightness. In other words: Should there arise brightness differences from coupling out of the optical element 3, e.g. gradients in one or several directions, or brightness spots, the image presented will be dimmed accordingly. For this purpose, after measuring the brightness differences, the system may determine reciprocal values of the relative brightness, e.g., normalized with a fixed factor, i.e. of the brightness normalized to values at which the highest relative brightness equals 1, and multiply these reciprocal values by the brightness values of the respective image details. In this way, the darkest details will not be dimmed, whereas the brightest details will be dimmed most.

Figure 5:
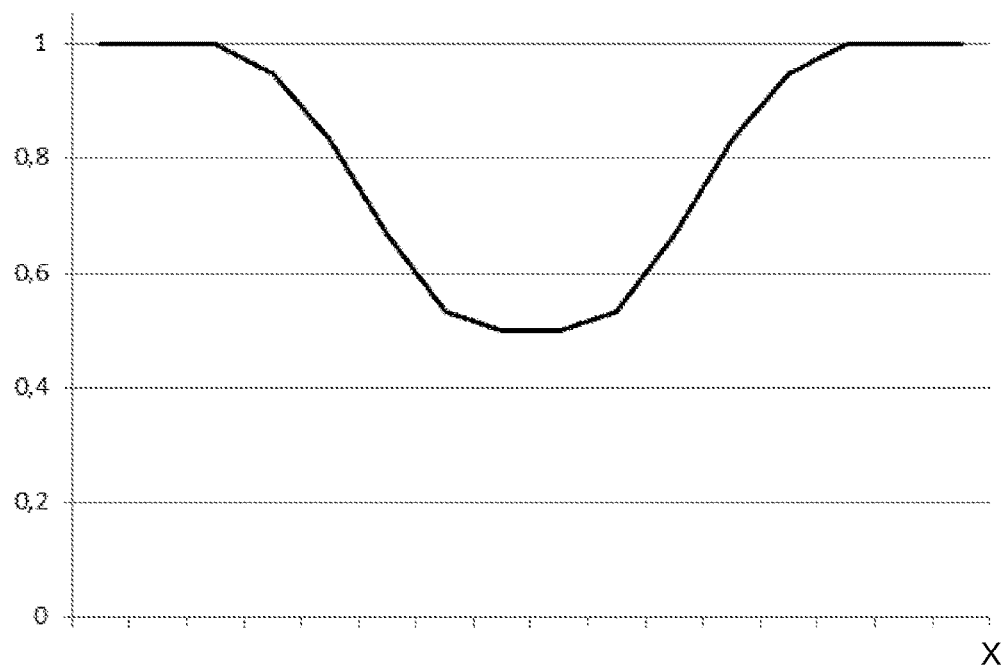
FIG. 5 is a graph of the relative brightness of the light coupled out of the optical element.
Figure 6:
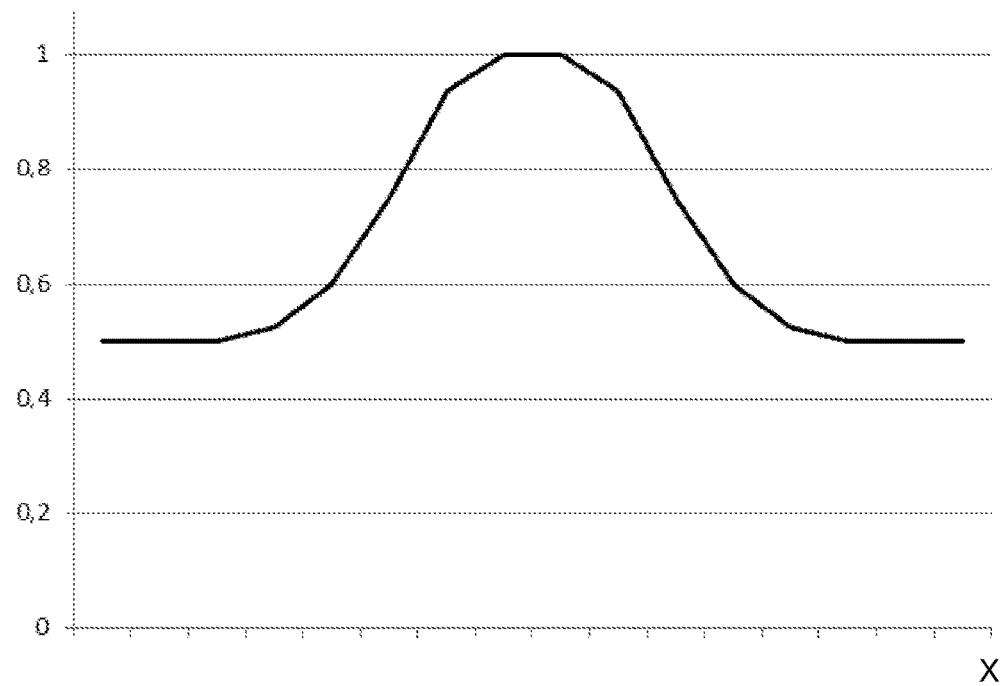
FIG. 6 is a graph showing corrective values for the brightness of an image to be presented, based on the facts according to FIG. 5.

In this connection, FIG. 5 shows a graph of the relative brightness of the light coupled out of the optical element 3, and FIG. 6 shows a graph of corrective values for die brightness of an image to be presented, based on the facts according to FIG. 5.

The relative brightness—as a rule, the luminance—according to FIG. 5 is determined simply by dividing the locally measured values by the maximum value, the unit being $cd/m^2$ or nit, as a rule. The abscissa is designated "X", which is meant here to be equivalent to the horizontal direction of the optical element 3. Then, for example, LED lines for light coupling are arranged at the two vertical narrow sides of the optical element 3 to obtain a brightness distribution as shown in FIG. 5.

The values according to FIG. 6 for the same (relative) locations in horizontal direction, but now on the transmissive imager 5, are obtained by forming the reciprocal of the relative brightness according to FIG. 5 and subsequent multiplication by a fixed factor; here, the factor is 0.5, for example. This factor serves for normalizing the reciprocals, as the brightness values for the image presented on the imager 5 must not be multiplied by a factor greater than 1, because the imager 5 itself cannot increase the brightness. As a rule, the said factor is the smallest relative brightness value, but if need be, it may be selected differently, say, for further dimming of the image as a whole.

Now, if the brightness values of the image to be presented on the imager 5 are locally, i.e. at the locations X, multiplied by the normalized reciprocals of relative brightness determined as described above, the overall image will, in mode B1, appear essentially homogeneous as regards brightness, because the brightness differences in illumination have been compensated in the image content by the optical element 3.

The lighting device described above can be used to advantage wherever confidential data are displayed and/or entered, such as in the entry of PINs, data display on automated tiller machines or cash terminals, or password entry for reading E-mails on mobile devices.

The lighting device is switchable, providing at least two lighting modes, with one mode illuminating a restricted solid angle only, and the other mode furnishing illumination in a solid angle that is as wide as possible.

Thus, if the lighting device is used with a display screen, information can be presented in a manner ensuring privacy with a selectable restricted viewing angle, whereas, in a second mode, free viewing is possible in a more or less unrestricted viewing angle. The lighting device can be implemented with simple means and at reasonable cost. In both operating modes described, B1 and B2, the full native resolution of the display screen used is visible. Further, a light loss involved is kept as low as possible.

Unlike prior art, neither need a strong UV light source be used, nor is it necessary first to convert, by complex technology, light distributions restricted in angle into unrestricted light distributions (which severely diminishes brightness), nor are complex prism or microlens structures required.

The invention claimed is:

1. A lighting device that can be used in at least two operating modes, for a free-viewing mode and a restricted viewing mode, comprising:
 a backlighting system of planar extension that the restricted-viewing mode radiates light in a restricted angular range, wherein the light emitted by the backlighting system is, in at least one direction situated at an angle greater than 45 degrees relative to the surface normal of the backlighting system, radiated with no more than 10% of the maximum luminous intensity,
 a plate-shaped optical element situated in front of the backlighting system as seen in the viewing direction, and
 illuminants arranged laterally at the narrow sides of the optical element,
 wherein
 the optical element is configured as a light guide, which consists of a matrix plastic and, homogeneously distributed therein, scattering particles of a polymer,
 the share of the scattering particles consisting of the polymer is 0.01 to 3 weight-percent relative to the matrix plastic,
 the refractive index nD of the polymer is at least 0.01 units above the refractive index nD of the matrix plastic, and the light guide is transparent to at least 80% of the light emitted by the backlighting system, so that, for a free viewing range in the free-viewing mode, the light laterally incident on the optical element from the illuminants is, in directions situated at angles greater than 45 degrees relative to the surface normal of the backlighting system, radiated with at least 20% of the maximum luminous intensity, wherein, in the restricted-viewing mode, the backlighting system is switched on and the illuminants are switched off, and wherein, in the free-viewing mode, the illuminants are switched on and the backlighting system is switched off.

2. The lighting device of claim 1, wherein the illuminants are LEDs or laser diodes.

3. The lighting device of claim 1, wherein the backlighting system comprises at least one optical layer for the collimating of light.

4. The lighting device of claim 1, wherein the backlighting system is configured as a side light, edge light, direct LED backlight, edge LED backlight, OLED or some other surface emitter.

5. The lighting device of claim 1, wherein the backlighting system is a backlight on which a privacy filter is applied.

6. The lighting device of claim 5, wherein the backlight is an edge light or a direct LED backlight.

7. The lighting device of claim 1 that additionally can be operated in a third operating mode, a particularly-bright-viewing mode, with both the backlighting system and the illuminants being switched on.

8. The lighting device of claim 1, further comprising in addition an electronic control system, which gradually controls a transition between operating modes in such a way that, over a course of time, the brightness of the backlighting system is decreased to zero, while the brightness of the illuminants is simultaneously increased to a maximum or to a specified level, and vice versa.

9. The lighting device of claim 1, wherein the optical element has a partially reflecting coat on its side facing the backlighting system, with the degree of reflection of the light coupled out of the optical element varying across the area to compensate brightness differences in the free-viewing mode, or with the partially reflecting coat being applied in such areas only in which brightness without a reflecting coat has dropped to below a specified limit.

10. The lighting device of claim 1, wherein a transmissive imager is arranged in front of the lighting device.

11. A lighting device that can be used in at least two operating modes, for a free-viewing mode and a restricted-viewing mode, comprising:

a backlighting system of planar extension that in the restricted-viewing mode radiates light in a restricted angular range, wherein the light emitted by the backlighting system is, in at least one direction situated at an angle greater than 45 degrees relative to the surface normal of the backlighting system, radiated with no more than 10% of the maximum luminous intensity, a plate-shaped optical element situated in front of the backlighting system as seen in the viewing direction, and illuminants arranged laterally at the narrow sides of the optical element, wherein the optical element is configured as a light guide, which consists of a matrix plastic and, homogeneously distributed therein, scattering particles of a polymer, the share of the scattering particles consisting of the polymer is 0.01 to 3 weight-percent relative to the matrix plastic, the refractive index nD of the polymer is at least 0.01 units above the refractive index nD of the matrix plastic, and the light guide is transparent to at least 80% of the light emitted by the backlighting system, so that, for a free-viewing range in the free-viewing mode, the light laterally incident on the optical element from the illuminants is, in directions situated at angles greater than 45 degrees relative to the surface normal of the backlighting system, radiated with at least 20% of the maximum luminous intensity, wherein, in the restricted-viewing mode, the backlighting system is switched on and the illuminants are switched off, and wherein, in the free-viewing mode, both the illuminants and the backlighting system are switched on.

12. The lighting device of claim 11, further comprising in addition an electronic control system, which gradually controls a transition between operating modes in such a way that, over a course of time, the brightness of the backlighting system is decreased to zero, while the brightness of the illuminants is simultaneously increased to a maximum or to a specified level, and vice versa.

13. The lighting device of claim 12, wherein the optical element has a partially reflecting coat on its side facing the backlighting system, with the degree of reflection of the light coupled out of the optical element varying across the area to compensate brightness differences in the free-viewing mode, or with the partially reflecting coat being applied in such areas only in which brightness without a reflecting coat has dropped to below a specified limit.

14. The lighting device of claim 13, wherein a transmissive imager is arranged in front of the lighting device.

15. The lighting device of claim 14, further comprising a control system that, in free-viewing mode, compensates across-the-area brightness differences of the light coupled out of the optical element by controlling the image contents presented on the transmissive imager in a manner complementary to the brightness differences, so that the image perceived on the transmissive imager is essentially homogeneous as regards brightness.

16. The lighting device of claim 14, wherein the transmissive imager comprises an LCD panel.

17. Use of a lighting device as claimed in claim 14 for the input or display of confidential data on automated teller machines, cash terminals or mobile devices.

18. The lighting device of claim 17, wherein the confidential data includes PINS, e-mails, SMS text messages or passwords.

* * * * *